Dec. 25, 1956  E. E. LEGGE ET AL  2,775,118
DIEING MACHINE LOAD MEASURING SYSTEM
Filed March 1, 1952.  2 Sheets-Sheet 1

INVENTORS
EDWARD J. STEPHENS
ELMER E. LEGGE
BY Parham & Bates
ATTORNEYS

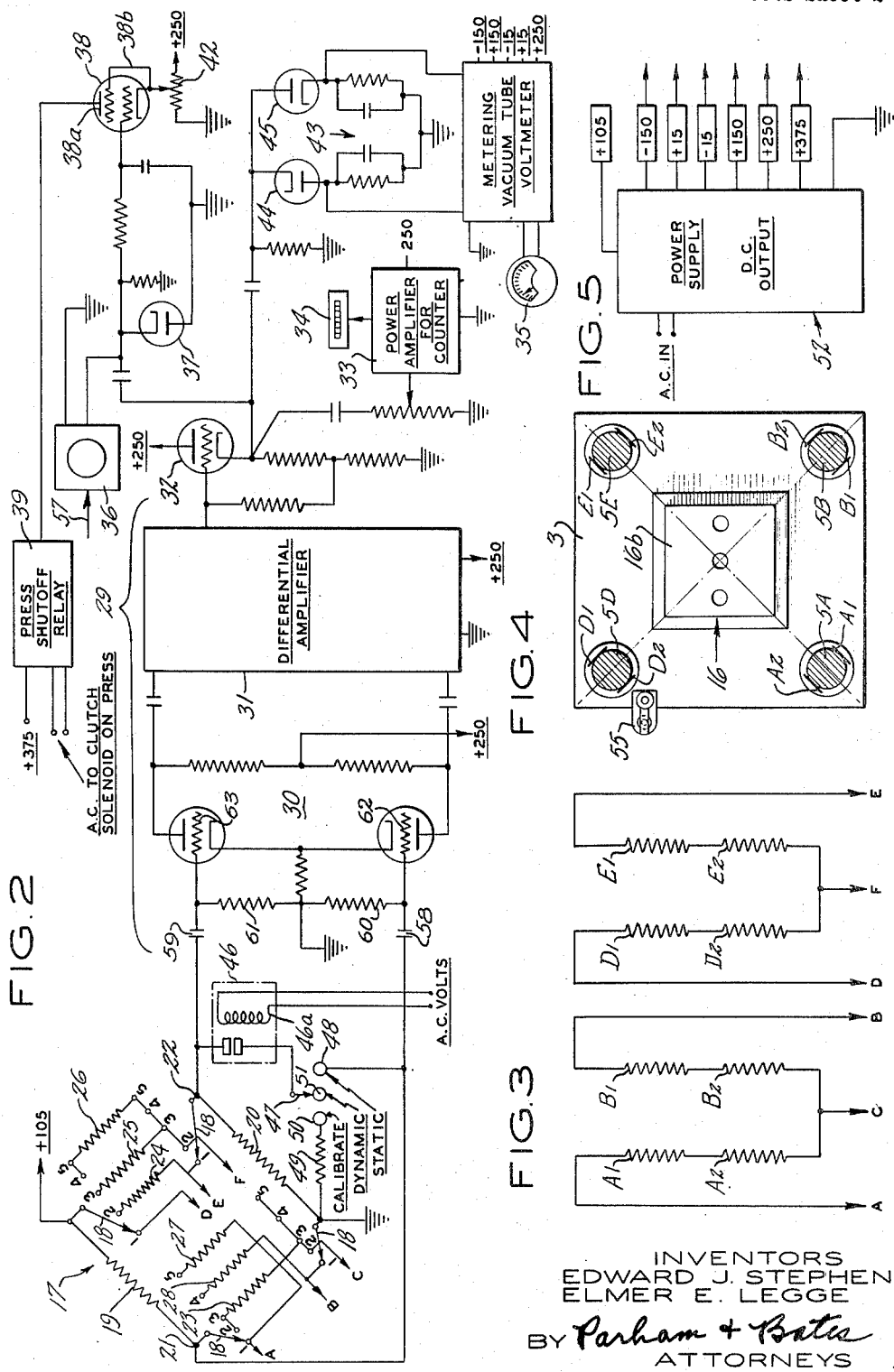

United States Patent Office 2,775,118
Patented Dec. 25, 1956

2,775,118

DIEING MACHINE LOAD MEASURING SYSTEM

Elmer E. Legge, West Hartford, and Edward J. Stephens, Manchester, Conn., assignors to Emhart Manufacturing Company, Hartford, Conn., a corporation of Delaware Application March 1, 1952, Serial No. 274,478

2 Claims. (Cl. 73—88.5)

The present invention relates to dieing machines, presses and the like and particularly to improved apparatus for controlling operation responsive to the load.

In accordance with the invention, apparatus is provided for automatically determining the relation of the load to the capacity of the press or dieing machine.

The invention further provides an electronic apparatus utilizing strain gauges which promptly indicates the measure of the load, its distribution, and the rate of application throughout the dieing, stamping or pressing cycle of operation.

Apparatus embodying the invention determines accurately and instantly the actual loads developed in the press under production conditions and makes possible selection of the most suitable press for a given die design.

The invention further provides fool-proof apparatus for counting completed pieces.

Advantages of apparatus embodying the invention include the following:

1. Provides a continuous meter reading in tons of the maximum load produced during a cycle.

2. Shows on an oscilloscope, synchronized to press operation, the instantaneous load pattern throughout the operating cycle. The load pattern is sharply defined and readily centered on the scope.

3. Provides automatic shut-off substantially instantaneously responsive to loads developed in the press exceeding a selective maximum.

4. Selectively measures and indicates the sum of the total loads on the guide rods and the individual loading on each guide rod to determine if an eccentric loading condition exists and to what extent.

5. Automatically counts only the number of pieces produced. The counter can be set to operate at any desired loading and will not register when machine is "cutting air" or operating below predetermined loads.

The invention makes possible fundamental improvements in metal stamping operations. It is invaluable in studying the initial running of a new die in a dieing machine.

In addition to revealing eccentric loading, it discloses whether the loading is within practical limits and suggest a redesign of dies if such is necessary to bring loading within desired boundaries.

The invention facilitates subsequent set-ups for rerunning the same job by enabling the operator to make his connection adjustments to reproduce the previously recorded tonnage for standard die load, thereby ensuring exact duplication of the previous setting.

It also indicates when the hardness or softness of stock exceeds predetermined limits and shows the degree of dulling of punches or dies reflected in increased loads.

Another advantage of the standard load measured for a given die is in determining the cut-off tonnage at which the apparatus should be set to stop the press electronically. Determination of the standard or optimum load is of further advantage in ensuring operation of the counter only when a major part of that load is repeated.

Other advantages are pointed out or will be apparent from the following description of the embodiments of the invention shown in the accompanying drawings in which:

Fig. 2 is a semi-schematic diagram of electronic apparatus for measuring the die load and its distribution and for controlling the operation of the machine shown in Fig. 1 in accordance with the invention;

Fig. 3 is a schematic view of electronic strain gauges shown in Fig. 1 the terminals of which are connectable to correspondingly identified terminals of the apparatus shown in Fig. 2;

Fig. 4 is a cross-sectional view taken on line 4—4 of Fig. 1 showing the location of the strain gages on the load-carrying guide rods of the dieing machine;

Fig. 5 is a schematic view of a power supply unit for the apparatus of Figs. 1–3;

Figure 1:
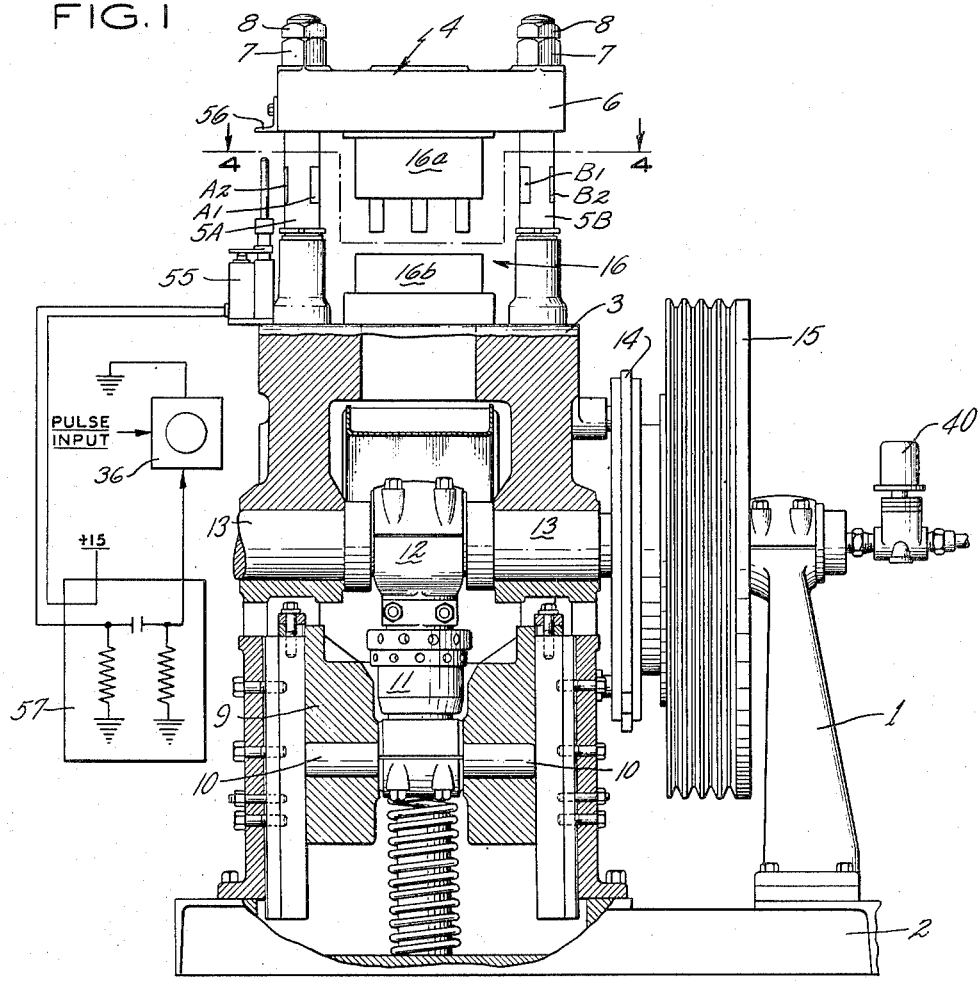
Figure 1 is a semi-schematic front elevation of a dieing machine incorporating the present invention.

A dieing machine is shown semi-diagrammatically in Fig. 1 and generally comprises a stationary frame 1 having a lower base portion 2 and an upper base or table portion 3 in which a subsframe, generally designated 4, is mounted for vertical reciprocal movement. The subframe 4 includes four identical vertical guide rods 5 which are symmetrically disposed adjacent the four corners of the frame 1 (Fig. 4) and to the upper ends of which a horizontally disposed upper cross-head 6 is secured by standard and check nuts 7 and 8, respectively. The lower ends of the rods 5 are secured to a horizontally disposed lower crosshead 9 which is provided with a wrist pin 10 to which the lower end of a connecting rod 11 is operably secured. The rod 11 is suitably adjustable in length and is operably connected at its upper end to crank 12 of a crankshaft 13 which is driven through a pneumatic clutch 14 by a belt driven flywheel 15. The cooperating halves 16a and 16b of a die-set, generally designated 16, are respectively secured to the opposing horizontal faces of the upper base plate 3 and the upper crosshead 6. Rotation of the crankshaft 13 raises and lowers the crosshead 6 relative to the base plate 3 and causes the die set 16 to perform its dieing or stamping operation on stock placed between the die halves.

The entire die load is distributed by the crosshead 6 to the four guide rods 5.

In accordance with the present invention, the total stress in the four guide rods and its distribution among the four rods is measurable during operation of the dieing machine. The invention provides for selectively measuring the stress in each of the rods 5. As shown in Figs. 1 and 4, a pair of strain gauges are secured to each rod 5 on diametrically opposite sides of the rods. All of the gauges are identical in electrical resistance. For convenient identification the four rods are individually designated 5A, 5B, 5D and 5E and their respective gauges designated $A_1$, $A_2$; $B_1$, $B_2$; $D_1$, $D_2$; and $E_1$, $E_2$.

Each of the gauges is a minute filament which is cemented or otherwise bonded longitudinally to its rod 5 so that it is subjected to the same compression or elongation as the rod. The resistance of the filament is altered in accordance with the degree of elastic structural deformation of the portion of rod to which it is bonded.

In accordance with the invention, each strain gauge preferably is located at least a rod diameter from the rod shoulder abutting the crosshead 6 thereby substantially avoiding irregular stress distribution patterns or end effects.

It should be understood that the die load is primarily one of compression which is distributed primarily as tension in the several rods 5. However, because the load is not applied in line with the rods, a bending moment is created which tends to "dish" the crosshead 6 and bend or bow the rods. The bending moment effects coupled compression and tension stresses in addition to the major tension stresses counteracting the load. The compression stress is at a maximum along the rod elements most remote from the line of application of the maximum die load and the coupled tension stress is at a maximum along the diametrically opposite rod elements which are nearest the load.

By locating the gages along the rods at 90° to the maximum compression and tension elements, the gages are responsive to the die load substantially exclusively of the bending movement forces exerted in the rods. Any bending moment stresses to which the gages may be responsive are canceled by the diametric opposite disposition of each pair of gauges on its rod and by connecting each pair in series, as shown in Fig. 3.

As shown in Fig. 4, each pair of diametrically opposite strain gauges are located so that the connecting diameter of the rod is disposed substantially at right angles to a line through the center of the rod and the diagonally opposite rod. The described location of the gauges is particularly suitable when the die load is centered at the intersection of the connecting diagonals shown in Fig. 4. However, if the load is substantially off-center each pair of gauges preferably are located so that the connecting rod diameter of each is at right angles to a line connecting the center line of its rod with the center line of the load. The bending movement exerted by the crosshead 6 on the rods 5 is least apparent at those points and therefore least affects the stressing of the gauge.

The terminals A, B, C, D, E and F of the gauges shown in Fig. 3 are connected by suitable connectors (not shown) to like designated terminals of the electronic apparatus shown in Fig. 2. As there shown, the pairs of strain gauges are selectively connected individually and together in a bridge circuit, generally designated 17, through a selector switch 18 so that the bridge potential is a measure of the change in the individual and the total resistance of the four pairs of gauges $A_1$, $A_2$; $B_1$, $B_2$; $D_1$, $D_2$; and $E_1$, $E_2$ effected on the four guide rods by the die load.

Fig. 2 shows the selector switch 18 in position #1 in which the gauges on rods 5A and 5B are connected in series with each other and with a fixed resistor 19 having a resistance equal to the total resistance of the four gauges $A_1$, $A_2$, $B_1$ and $B_2$. The selector switch 18 in its position #1 similarly connects the four gauges $D_1$, $D_2$, $E_1$ and $E_2$, in series with each other and a fixed resistor 20 and the two series of resistors and gauges in parallel across a 105 v. power supply. As shown in Fig. 2, the two fixed resistors 19 and 20 are in opposite rather than adjacent legs of the bridge circuit so that the changes in resistance of the strain gauges effected by loading of the guide rods 5 are cumulative in their unbalancing effect on the potential across bridge terminals 21 and 22.

The selector 18 also provides for inserting fixed resistors for each pair of strain gauges so that equivalent fixed resistance can be inserted readily in the bridge circuit 17 for all but any selected pair of gauges on the guide rods 5. Thus in selector switch positions #2 and #3, there is substituted for gages $A_1$, $A_2$; $B_1$ and $B_2$, a fixed resistor 23 having the same resistance as the total of the replaced gauges and also the same resistance as the resistors 19 and 20. In position #2, a fixed resistor 24 is substituted for gauges $D_1$ and $D_2$ in series with gauges $E_1$ and $E_2$ so that the potential across the bridge terminals 21 and 22 varies only in response to changes in resistance of the latter gauges $E_1$, $E_2$ effected by the load on the guide rod 5E. Similarly in position #3, the selector switch 18 connects a fixed resistor 25 as a substitute for gauges $E_1$ and $E_2$ in series with gauges $D_1$ and $D_2$ so that the potential across the bridge terminals 21 and 22 varies only in response to the load on the guide rod 5D to which the gauges $D_1$ and $D_2$ are attached.

Fixed resistors 26, identical with the resistors 19, 20 and 23, and resistors 27 and 28 identical with the resistors 24 and 25 are provided for determining in like manner changes in load on guide rods 5B and 5A when the selector switch 18 is in positions #4 and 5, respectively.

The potential across the bridge terminals 21 and 22 created by unbalancing of the bridge circuit 19 responsive to the die load on the guide rods is fed into a high gain amplifier, generally designated 29, having two R. C. coupled stages, one of which is a push-pull stage 30 which feeds a differential amplifier stage 31. The output of the differential amplifier 31 feeds a cathode follower 32 which provides a low impedance source to feed a power amplifier 33 of a counter 34; a metering vacuum tube voltmeter 35; a cathode ray oscilloscope 36 and, through a clamping diode 37, a thyratron firing circuit 38 which actuates shutoff relay 39 controlling a clutch operating solenoid 40 on the dieing machine (Fig. 1).

The power amplifier 33 amplifies the output of the cathode follower 32 sufficiently to actuate the counter 34 only when a preselected minimum load is exerted by the die 16. The counter 34 can be set to operate at any desired minimum load and will not register when the machine is "cutting air" or operating below the preselected minimum.

The press "shut off" relay 39 is connected and responsive to the voltage of the thyratron plate 38a, and opens the solenoid 40 of an air clutch 14 to relieve the die 16 from the force of the fly wheel whenever the thyratron 38 is triggered by the cathode follower 32. The point of triggering is preselected by changing the voltage on the cathode 38b by means of a variable resistor 42.

The thyraton 38 is coupled to the cathode follower by a coupling condenser the voltage of which averages zero. The clamping diode 37 assures that the selected peak voltage of the cathode follower 32 triggers the thyratron 38.

As shown in Fig. 2, the cathode follower 32 feeds the meter 35 through a storage and amplifier circuit 43 which rectifies positive and negative peaks of voltage through two oppositely connected diodes 44 and 45 and amplifies the peak-to-peak voltage so developed and feeds the meter 35.

If a static load is being metered, the steady output voltage of the bridge is interrupted by means of a relay-like device or chopper 46, the coil 46a of which is energized by current derived from an A. C. line. The chopper 46 is connected across the bridge 17 when a selector switch 47 engages a terminal 48. During static operation the bridge must remain balanced because any unbalance introduces errors. During dynamic tests, balance of the bridge is not critical because the meter will not respond to the drift of the bridge and is responsive only to dynamic loads. The pattern on the scope produced by a dynamic load indicates the rate at which the load is applied.

When the meter 35 is to be calibrated, a calibrating fixed resistor 49 is connected in series with the chopper 46 across the fixed resistor arm 20 of the bridge 17 by moving the selector switch 47 into engagement with the calibrating terminal 50 when no load is exerted by the dieing machine. The load registered on the meter 35 by the insertion of the resistor 49 is adjusted to indicate directly in tons the load corresponding to a like unbalancing of the bridge by the strain gauges on the guide rods 5 of known diameter and modulus. Thereafter, the switch 47 may be connected to load terminal 51 and the meter will indicate the load exerted on the guide rod or rods, the strain gauges of which are then connected in the bridge 17 by the selector switch 18.

The power supply, generally designated 52 in Fig. 5, delivers the D. C. voltage listed on the right side of the block diagram to the like marked terminal lines of the circuit shown in Figs. 1 and 2. The use of D. C. voltage is preferable because it prevents loss of zero calibration on the meter 35 due to temperature change of the resistors and gauges in the bridge 17. However, A. C. voltage may be employed utilizing a demodulator and suitable precautions to correctly zero the meter as may be required. When A. C. voltage is employed the chopper 46 is unnecessary for gauging static loads.

As is apparent in Fig. 2, blocking condensers 58 and 59 and resistors 60 and 61 constitute an R. C. coupling circuit between the bridge output points 21, 22 and grids 62, 63 of the push-pull stage 30 of the amplifier 29.

In order to synchronize the pattern on the oscilloscope 36 with the movement of the dieing machine crosshead 6, a normally open microswitch 55 (Fig. 1) is closed by a lug 56 when the crosshead is lowered thus completing a circuit through a synchronizing unit 57 which activates the oscillocope 36 at the initiation of each stroke of the dieing machine.

Normally the above-described apparatus is operated with the selector switch in the #1 or total load measuring position. When so operated, the counter 34 counts only those die strokes in which the selected minimum load is applied. Dry run strokes and those in which less than the minimum selected load is applied are not counted.

The meter indicates directly in tons or other weight units the total load exerted by the die. When the load exceeds a preselected maximum, the thyratron 38 is fired thereby energizing the press shut-off relay 39 which immediately releases the clutch 14 and relieves the crankshaft 13 and die from the force of the flywheel 15.

Figure 6:
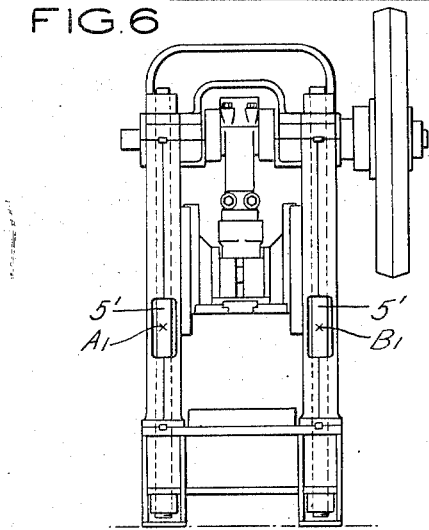
Fig. 6 is a view similar to Fig. 1 showing the invention as embodied in a straightside press.

Referring to Fig. 6, the strain gauge measuring and controlling apparatus heretofore described is shown applied to the stationary rods 5' of a conventional straight-side press which receives the full load of the die set 16 substantially as do the moving guide rods 5 of the dieing machine shown in Fig. 1. As in the latter machine, the strain gauges $A_1$, $A_2$; $B_1$, $B_2$; $D_1$, $D_2$; and $E_1$, $E_2$ are preferably located on the rods 5' in the same positions as those shown in Figs. 1 and 4.

Figure 7:
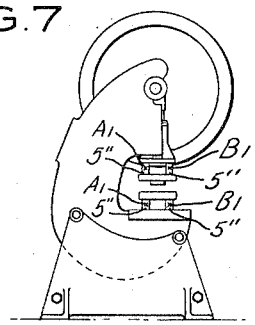
Fig. 7 is a view similar to Figs. 1 and 6 showing the invention embodied in supporting compression members of a die-set in a C-type press.

The gauges also may be applied to fixed vertical rods 5" supporting one or the other half of a die set, relative to either the movable or stationary platen, of any press as, for example, the C-type press shown in Fig. 7. Both alternative arrangements are there shown. The rods 5" differ from rods 5 and 5' in that they are primarily compression rather than tension members.

They, however, are similar in that in each instance the load is entirely transmitted through a plurality of parallel members on which the strain gauges are located. The members are uniform and provide generally straight line load transmission as well as a generally uniform stress distribution pattern so that the load distribution among the members as well as the total load is readily measured.

The invention makes possible fundamental improvements in metal stamping operations. By adjusting the selector switch 18 successively to positions #2, 3, 4 and 5, the loading of the several guide rods 5 are individually measured. This operation is invaluable in studying the initial running of a new die in a dieing machine and in providing for periodic check-ups with respect to the normal die load and how it compares with the capacity of the press.

At the same time, eccentric loading, if any, is disclosed, whether it is within practical limits and suggests redesign of dies if such is necessary to bring loading within desired boundaries.

Once the tonnage of a die has been recorded and stock hardness determined, the invention facilitates subsequent set-ups for re-running the same job by enabling the operator to make his adjustments to reproduce the recorded tonnage for the die, thereby ensuring exact duplication of the previous operation.

The hardness or softness of successively fed stock and the degree of dulling of punches or dies, is reflected in measured loads changes which can be immediately corrected without waste production.

Having thus described the invention, we claim:

1. In combination, force members movable relative to each other for stressing a work piece therebetween, force means for repetitively moving and progressively loading said members in stressing relationship, a plurality of parallel rods generally paralleling the resultant force effected between the two members and carrying the total force on one of said members, an electrically responsive strain gauge on each of said rods, and electronic means for selectively measuring the total and individual loads on said rods, and stroke counting means actuated by said measuring means for counting only those strokes of the repetitively moving members when said force means exerts a preselected minimum load.

2. In combination, force members movable relative to each other for stressing a work piece therebetween, force means for repetitively moving and progressively loading said members in stressing relationship, electronic measuring means including an electrically responsive strain gauge responsive to the load exerted by the force means through the force members for indicating the load, and stroke counting means actuated by said measuring means for counting only those strokes of the repetitively moving members when said force means exerts a preselected minimum load, and electrical means for adjustably preselecting said minimum load.

References Cited in the file of this patent

UNITED STATES PATENTS

| | | |
|---|---|---|
| 1,732,706 | Wiles | Oct. 22, 1929 |
| 2,303,596 | Zeitlin | Dec. 1, 1942 |
| 2,316,975 | Ruge | Apr. 20, 1943 |
| 2,328,967 | Donnell et al. | Sept. 7, 1943 |
| 2,367,746 | Williams | Jan. 23, 1945 |
| 2,416,276 | Ruge | Feb. 18, 1947 |
| 2,416,664 | Ruge | Feb. 25, 1947 |
| 2,439,146 | Ruge | Apr. 6, 1948 |
| 2,455,285 | Versaw | Nov. 30, 1948 |
| 2,458,481 | Ruge | Jan. 4, 1949 |
| 2,530,184 | Statham | Nov. 14, 1950 |
| 2,544,400 | Sourwine | Mar. 6, 1951 |
| 2,547,926 | Cook | Apr. 10, 1951 |
| 2,559,718 | Goodlet et al. | July 10, 1951 |

FOREIGN PATENTS

| | | |
|---|---|---|
| 565,462 | Great Britain | Nov. 10, 1944 |